UNITED STATES PATENT OFFICE.

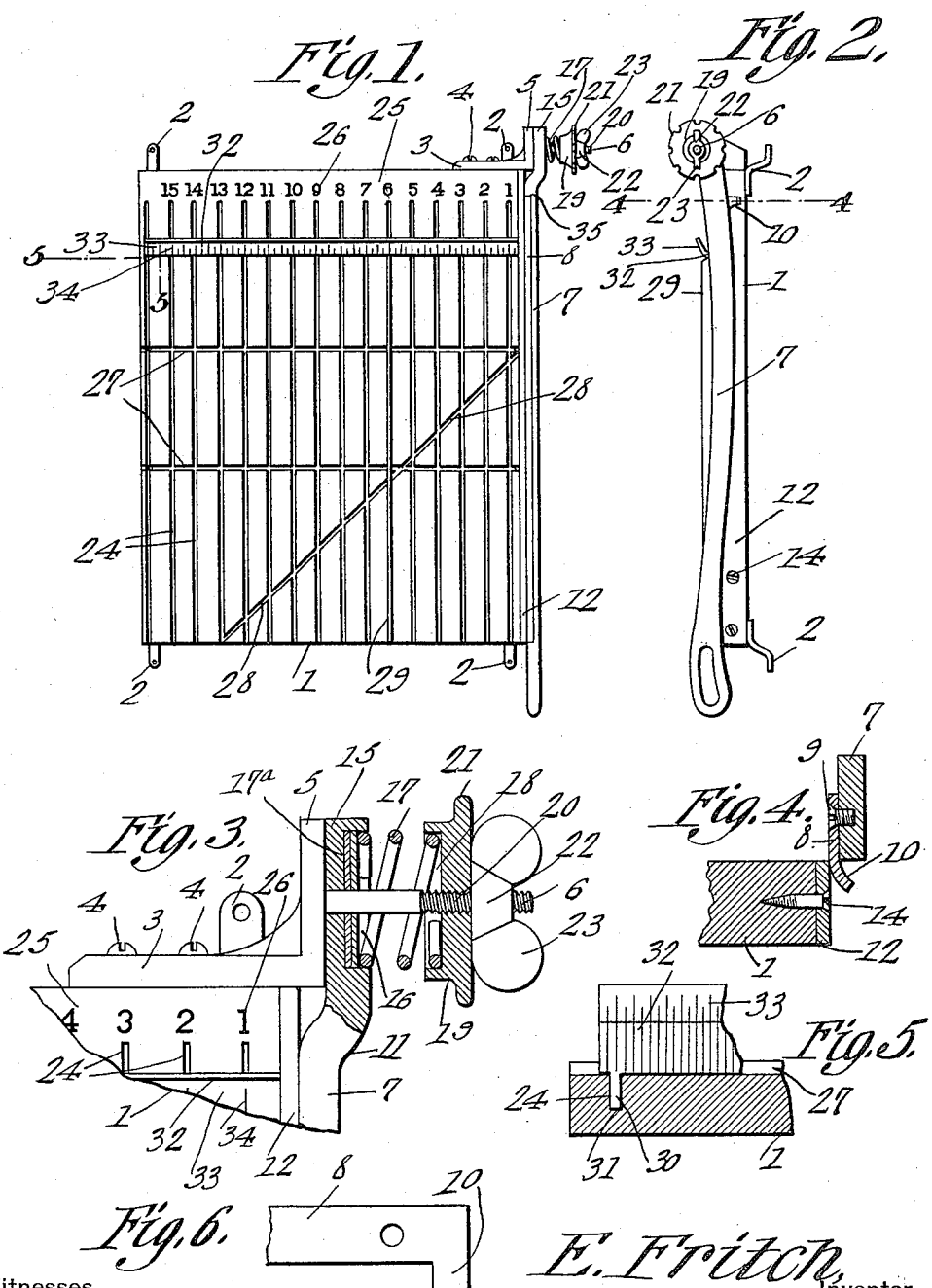

EUGENE FRITCH, OF SCHENECTADY, NEW YORK.

TRIMMING-BOARD.

1,172,127.　　　　Specification of Letters Patent.　　Patented Feb. 15, 1916.

Application filed December 21, 1914.　Serial No. 878,353.

*To all whom it may concern:*

Be it known that I, EUGENE FRITCH, a citizen of the United States, residing at Schenectady, in the county of Schenectady and State of New York, have invented a new and useful Trimming-Board, of which the following is a specification.

The device forming the subject matter of this application is adapted to be employed for trimming paper and the like.

One object of the invention is to improve the fulcrum mounting of the cutting lever.

A further object of the invention is to provide novel means whereby when the cutting lever is lowered, the working portion of the cutting lever will be compelled to coöperate properly with a fixed cutter attached to the base on which the lever is fulcrumed.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in top plan; Fig. 2 is a side elevation; Fig. 3 is a fragmental top plan wherein portions of the lever and adjacent parts appear in section; Fig. 4 is a transverse section taken through the cutting lever and a portion of the base on the line 4—4 of Fig. 2; Fig. 5 is a fragmental section taken transversely of the base on the line 5—5 of Fig. 1 and depicting the manner in which one of the straight edges is mounted; Fig. 6 is a fragmental side elevation of the removable cutter which is detachably assembled with the lever.

In carrying out the present invention there is provided a base 1 which may be in the form of a hard wood board or any other material, the same being supported upon legs 2 of any desired construction. Attached to one end of the base 1 at one corner of the base by means of screws 4 is a bracket 3 embodying an angular arm 5 provided with a laterally extended stud 6 which may be threaded as shown at 20.

The invention includes a cutting lever 7 to the inner edge of which a blade 8 is applied, the blade 8 being held in place on the lever 7 by means of securing elements 9. As shown at 35, a shoulder is formed in the lever 7, which shoulder receives one end of the removable blade 8. The removable blade 8 is provided, adjacent the fulcrumed end of the lever 7 with a depending finger 10 which is laterally inclined or curved away from a fixed plate 12 attached by means of securing elements 14 to one edge of the base 1. As shown at 11, the lever 7 is offset so that the lever will coöperate properly with the arm 5 of the bracket 3 and so that at the same time the cutter or blade 8 on the lever 7 will coöperate properly with the fixed cutter 12 on the base 1. The lever 7 terminates in a head 15 and it is through this head 15 that the stud 6 passes, a fulcrum for the lever thus being afforded. Owing to the fact that the lever bearing portion 5 of the bracket 3 is located outside of the base 1 and beyond the cutting edges of the cutters 8 and 12, there is no obstruction offered when cutting long strips of paper, the same sliding unobstructed past the bracket. The foregoing is a distinct improvement over other devices adapted for a similar purpose.

The invention comprises a helical compression spring 17 which surrounds the stud 6. The inner end of the spring 17 is received by two washers 17ª located in a recess 16 in the head 15 of the lever 7. The washer 17ª permit the lever 7 to move with a minimum amount of binding action. The outer end of the helical compression spring 17 is received in a recess 18 formed in the inner face of a main nut 19 which preferably is of circular contour and is provided with a peripheral turning flange 21, the nut 19 being threaded onto the stud 6. Threaded onto the stud 6 and coöperating with the main nut 19 is a lock nut 22 which may be provided with wings 23.

Formed longitudinally in the base 1 and disposed parallel to the plane in which the cutting lever 7 moves are a plurality of longitudinal grooves 24, the grooves 24 being designated for convenience as the primary grooves. The primary grooves 24 terminate short of one end of the base 1 to define a ledge 25 which may be inscribed with numerals 26 individual to the primary grooves 24. Disposed transversely of the primary grooves 24 are secondary grooves 27 which preferably lie at right angles to the plane in which the lever 7 moves during the cutting operation. In the upper face of the base 1 may be fashioned a diagonal groove 28.

Adapted to be mounted in any of the secondary grooves 27 is a straight edge 32 provided with a rearwardly extended flange 33, the flange 33 and the upright portion of the straight edge being graduated as shown at 34. The straight edge 32 may be provided at its ends with projections 30 adapted to be received in sockets 31 formed in the base 1 near the ends of the grooves 27.

Adapted to be mounted in any of the grooves 24 is a straight edge 29 which abuts terminally against the straight edge 32 and is disposed at right angles thereto. The straight edge 29 if desired may be mounted in the diagonal groove 28.

Assuming that the straight edges 29 and 32 are mounted as shown in the drawings, the paper to be cut is placed in terminal abutment with the straight edge 29 and is cut off by the action of the lever 7. The trimmed edge of the paper is then placed against the straight edge 32 and the paper is again trimmed, the trimming operation being continued until the paper is in form of a true rectangle. The graduations 34 on the flange 33 of the straight edge 32 may be employed for positioning the straight edge 29 properly. When the lower portion only of the board is to be used, the straight edge 32 may be removed from the positions shown in Fig. 1 and be placed in any of the other grooves 27. The straight edge 29 is placed in the diagonal groove 28 when a bevel cut is desired. Both of the straight edges may be removed readily, should it be desired to use the board without either of the straight edges.

The outwardly inclined finger 10 on the blade 8 coöperates with the fixed blade 12 on the base 1 to carry the lever 7 laterally when the lever is lowered, thus rendering it impossible for the cutting edges of the blades 8 and 12 to be dulled by mutual contact when the lever 7 is operated.

The spring 17 serves to hold up the blade 8 on the lever 7 against the blade 12 on the base 1, so that a clean cut may be made. The effort of the spring 17 may be adjusted by rotating the nut 21 and the nut 21 may be held in place by rotating the lock nut 23 into abutment with the nut 21.

Owing to the fact that the straight edge 32 is provided with the inclined flange 33, the graduations 34 on the straight edge are always visible. The projections 30 on the straight edge 32, engaging with the sockets 31, prevent the straight edge 32 from moving endwise and rendering it certain that the graduations 34 will coöperate properly with the grooves 24.

There is a distinct advantage in fashioning the finger 10 on the blade 8 instead of on the lever 7. Since the finger 10 is on the blade 8 and is flexed laterally, as shown in Fig. 4, so as to extend beneath the lever 7, the finger coöperates with the lower edge of the lever 7 and aids in holding the blade 8 in place on the lever.

Having thus described the invention, what is claimed is:—

1. In a device of the class described, a base; a fixed cutter carried thereby; a cutting lever; a base-carried fulcrum for the lever; and spring means for moving the lever transversely to cause the lever to coact with the cutter; the lever being provided adjacent its fulcrum with a depending finger flexed outwardly away from the base and adapted to coöperate with the fixed cutter when the lever is depressed, thereby to move the lever laterally against the action of the spring means when the depression of the lever is initiated.

2. In a device of the class described, a base; a fixed cutter carried thereby; a cutting lever; a base carried fulcrum for the lever; a movable cutter mounted on the lever; and spring means for moving the lever transversely to cause the movable cutter to coact with the fixed cutter; the movable cutter being provided adjacent the fulcrum of the lever with a depending finger flexed outwardly away from the base and adapted to coöperate with the fixed cutter when the lever is depressed, thereby to move the lever laterally against the action of the spring means when the depression of the lever is initiated, the finger coöperating with the lower edge of the lever to aid in holding the movable cutter in place on the lever.

In testimony that I claim the foregoing as my own, I have hereto affixed my signature in the presence of two witnesses.

EUGENE FRITCH.

Witnesses:
 MARTIN M. CUMMINGS,
 STEPHEN SCHWARTZ.

Copies of this patent may be obtained for five cents each, by addressing the "Commissioner of Patents, Washington, D. C."